United States Patent [19]

Fiore et al.

[11] Patent Number: 5,055,547
[45] Date of Patent: Oct. 8, 1991

[54] LIQUID-CRYSTAL COPOLYETHERS BASED ON 7-OXA-BICYCLO(2,2,1)HEPTANE

[75] Inventors: Leonardo Fiore, Milan; Giuseppe Motroni, Galliate; Mauro Maritano, Rovellasca, all of Italy

[73] Assignee: Montedison S.p.A., Milan, Italy

[21] Appl. No.: 352,678

[22] Filed: May 10, 1989

Related U.S. Application Data

[63] Continuation of Ser. No. 95,609, Sep. 11, 1987, abandoned.

[30] Foreign Application Priority Data

Sep. 15, 1986 [IT] Italy ................................ 21698 A/86

[51] Int. Cl.$^5$ ............ C08G 59/00; C08G 65/00; C08G 12/26; C08G 65/02
[52] U.S. Cl. .................................. 528/249; 528/230; 528/232; 528/233; 528/235; 528/236; 528/241; 528/408; 528/409; 528/412; 528/417
[58] Field of Search ................................ 528/249, 417

[56] References Cited

U.S. PATENT DOCUMENTS

| | | | |
|---|---|---|---|
| 2,856,370 | 10/1958 | Muetterties | 528/408 |
| 3,372,146 | 3/1968 | Sidi | 528/249 |
| 3,390,129 | 7/1968 | Furukawa et al. | 528/249 |
| 3,393,157 | 7/1968 | Janssen et al. | 528/408 |
| 3,417,033 | 12/1968 | Weissermel et al. | 528/417 |

Primary Examiner—John Kight, III
Assistant Examiner—Frederick Krass
Attorney, Agent, or Firm—Stevens, Davis, Miller & Mosher

[57] ABSTRACT

The present invention relates to copolyethers comprising copolymers of 7,oxa-bicyclo(2,2,1)heptane, and its alkyl-derivatives, with one or more single-ring or condensed-rings cycloaliphatic ethers, comprising the characteristic group;

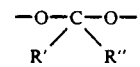

wherein R′ is hydrogen and R″ is H, a halogen, or an alkyl radical containing a small number of carbon atoms, and which may also be halogen-substituted.

If the ether contains one ring only, it contains from 5 to 12 atoms in the ring, and if it contains a condensed-ring system, it contains a total number of from 10 to 18 atoms in the rings.

Those copolyethers show a anisotropic behaviour in the molten state, and therefore have liquid-crystal properties.

11 Claims, No Drawings

LIQUID-CRYSTAL COPOLYETHERS BASED ON 7-OXA-BICYCLO(2,2,1)HEPTANE

This application is a continuation of application Ser. No. 095,609, filed Sept. 11, 1987, now abandoned.

FIELD OF THE INVENTION

The present invention relates to liquid-crystal copolyethers, and to a process for preparing them.

More precisely, it relates to copolymers of 7,oxabicyclo(2,2,1)heptane having the formula:

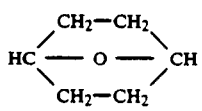

or its derivatives substituted in the 2-, 3-, 5-, 6- positions with alkyl radicals having a small number of carbon atoms, with a particular class of cycloaliphatic ethers.

BACKGROUND OF THE INVENTION

The homopolymer of 7, oxa-bicyclo(2,2,1)heptane and of its alkyl-derivatives is known and is described in the technical literature. This homopolymer, although showing a crystallinity at X-rays, is poorly soluble in most common solvents, and suffers from the drawback that it has a melting temperature (generally higher than 350° C.) which is higher than its decomposition temperature. This set of properties makes the homopolymer not very interesting from an industrial viewpoint, due to the moulding difficulties.

THE PRESENT INVENTION

It was found now that by copolymerizing 7,oxabicyclo (2,2,1)heptane of formula (I), or an alkyl-derivative thereof, with particular comonomers, it is possible to obtain copolymers which, besides having a melting point controlled by the amount and type of the comonomer, employed surprisingly show an anisotropic behaviour in the molten state and hence display liquid-crystal behaviour.

It is known that the polymers having with such a behaviour show, in the molten state, and within a defined temperature range, an ordered arrangement of the molecular chains, which is maintained in the solid state, securing to the solid polymer special properties, such as a high elastic modulus, a high tensile stress and, in general, the typical properties of fibre-reinforced polymer.

It was furthermore found that the copolymers in question show a high crystallinity, which gives the polymer advantageous properties, such as a lower heat distortion, and a higher resistance to attack by solvent.

Therefore, the objects of the present invention are the copolymers endowed with an anisotropic behaviour in the molten state, comprising copolymers of 7,oxabicyclo, (2,2,1) heptane, or its derivatives substituted in the 2-, 3-, 5-, 6-positions with alkyl radicals having a small number of carbon atoms, with one or more single-ring or condensed-ring cycloaliphatic ether(s), comprising the characteristic group:

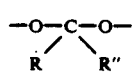

wherein R' is hydrogen and R" is H, a halogen, or an alkyl radical containing a small number of carbon atoms, possibly halogen-substituted, with the proviso that if the ether contains one ring only, it contains from 5 to 12 atoms in the ring, and if it contains a condensed ring system, it contains a total number of from 10 to 18 atoms in the rings.

By the term "alkyl radicals containing a small number of carbon atoms", as used in the present specification and in the appended claims, alkyl radicals are meant, which contain from 1 to 4 carbon atoms.

Cycloaliphatic ethers wherein R" is H, Cl, F, $CH_3$, $C_2H_5$, $CH_2Cl$, $CH_2F$, $CF_3$ or $C_2F_5$ are preferred.

The single-ring cycloaliphatic ethers are preferably selected from the compounds which are defined by the general formula (II):

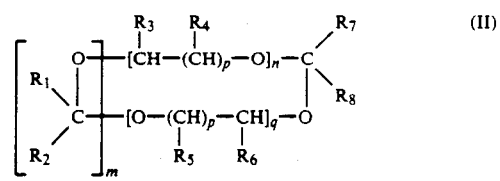

wherein
m=0, 1 or 2;
n=0, 1 or 2;
p=1, 2 or 3;
q=0, 1 or 2;
$R_1$, $R_2$, $R_3$, $R_4$, $R_5$, $R_6$, $R_7$, $R_8$, equal to or different from one another, preferably represent H, Cl, F, $CH_3$, $C_2H_5$, $CH_2Cl$, $CH_2F$, $CF_3$ or $C_2F_5$, with the proviso that, if n=0 and q=0, then m=2.

Among the cyclic ethers having formula (II), the following are preferred:

a) 1,3-dioxacyclopentane, having the formula:

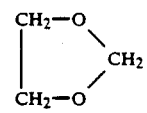

and its replaced derivatives, i.e., those in which one or more H atoms are substituted by $CH_3$ or $C_2H_5$;

b) 1,3,6-trioxacyclooctane, having the formula:

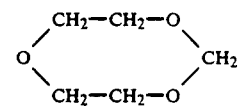

and its derivatives substituted with $CM_3$ or $C_2H_5$;

c) 1,3,6,8-tetraoxacyclodecane, having the formula:

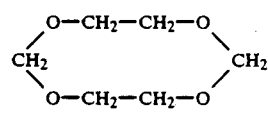

and its derivatives substituted with $CH_3$ or $C_2H_5$;

d) 1,3,5-trioxacyclohexane, having the formula:

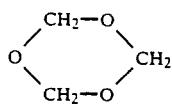

and its derivatives substituted with $CH_3$ or $C_2H_5$; 1,3-dioxacycloheptane, having the formula:

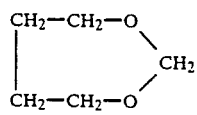

and its derivatives substituted with $CH_3$ or $C_2H_5$.

The condensed-ring cyclic ethers are preferably selected from those defined by the general formula (III):

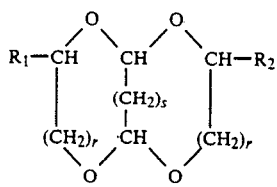

wherein r=1 or 2, s=0, or $R_1$ and $R_2$ have the above reported meanings.

Among the bicyclic ethers of formula (111), 2,5,7,10-tetraoxa-bicyclo(4,4,0)decane, of formula:

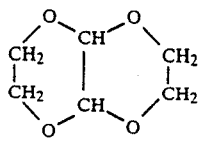

and its derivatives substituted with $CH_3$ or $C_2H_5$ are preferred.

The copolyether of the present invention comprises preferably 7,oxa-bicyclo(2,2,1)heptane, or an alkyl-derivative thereof, with one cycloaliphatic ether only.

The cycloaliphatic ethers are generally present in the copolymer in molar amounts within tha range of from 0.i to 50%, and preferably of from 2 to 20%, relative to the total of the monomers.

In general, the copolyethers of the present invention have an inherent viscosity of at least 0.1 dl/g. viscosities within the range of from 0.3 to 5 dl/g are preferred.

The inherent viscosity is measured at 30° C. in phenol/tetrachloroethane (60/40 by volume) at the concentration of 2.5 d/l.

The copolyethers of the present invention can be prepared according to any known processes, and, in particular, by reacting 7,oxa-bicyclo(2,2,1)heptane, or an alkyl derivative thereof, with the cycloaliphatic ether(s), in the presence of a cationic polymerization catalyst. Particularly suitable are the Lewis acids, such as $BF_3$, $BF_3$ complexed with electron donors (e.g., ethyl ether), pure $FeCl_3$, or $FeCl_3$ in the presence of activators (e.g., $SOCl_2$), $SnCl_4$ and $HClO_4$, etc.

The catalyst is generally present in catalytic amounts within the range of from 0.0001%, and preferably of from 0.001 to 0.5%, by weight, relative to the monomers.

The monomers and the reaction environment are preferably anhydrous, or substantially anhydrous.

The polymerization is preferably carried out in the absence of solvents. In case solvents are used, there can be used, e.g., hydrocarbons (such as benzene or cyclohexane), chlorinated hydrocarbons (such as methylene chloride), or nitroarenes (such as nitrobenzene).

The polymerization temperature is generally within the range of from −20° C. to 120° C., and preferably of from 0° C. to 60° C.

The copolyethers of the present invention have liquid-crystal properties, and are particularly suitable for use then blended with thermoplastic resins to improve such mechanical properties thereof, thereof as the elastic modulus, the tensile strength, and so forth.

Thermoplastic resins which are particularly suitable for this purpose are the thermoplastic polyester resins, ABS resins, polycarbonates, and so forth.

Therefore, further objects of the present invention are shaped articles based on the above-said copolyethers, formed under such conditions as to take advantage of the properties deriving from the liquid-crystal state.

The following examples are supplied for illustrative purposes, and are not to be construed as being in anyway limitative of the invention.

EXAMPLE 1

7 oxa-bicyclo(2,2,1)-heptane is purified by refluxing and subsequent distillation over sodium-potassium alloy, under a nitrogen atmosphere.

1,3-dioxacyclopentane is purified by azeotropic distillation with cyclohexane, working inside a TODD type rectification column under a nitrogen atmosphere.

To a 50-ml glass reactor, which was previously dried, the following reactants were charged under a nitrogen atmosphere:

| | |
|---|---|
| 7-oxa-bicyclo(2,2,1)-heptane | 18 ml |
| 1,3-dioxacyclopentane | 0.54 ml |
| $BF_3.Et_2O$ (solution in ether at 20% by volume) | 0.20 ml |

The reaction mixture was stirred 30 minutes at room temperature (approximately 25° C.); stirring was discontinued, and the reaction was completed over a 20-hour time, always at room temperature.

The polymerization was quenched with an equal volume of methanol, containing 1% by volume of $NH_4OH$. The polymer, ground into a powder form, was repeatedly washed with a 20/5/0.5 (by volume) methylene chloride/methanol/$NH_4OH$ mixture.

In such a way, after drying at 50° C. in vacuo, 14.6 g (yield: 81%) was obtained of a polymer as a white powder.

At X-ray analysis the polymer was shown to be crystalline, with main reflections at $2\theta$ (Cu, K$\alpha$): 18.3°; 18.8°; 19.5°; 23.5°; 33.4°.

The polymer had an inherent viscosity of 0.95 dl/g (measured at the concentration of 2.5 g/1 in phenol/tetrachloroethane (60/40 by volume) at 30° C.).

After repeated thermal cycles on the differential calorimeter (DCS), the polymer gave rise (at a temperature increase rate of 20° C./min) to two endothermic peaks: the first one (melting) at 120° C., and the second one (isotropization of the molten polymer) at 230° C.-240° C.

With a temperature decrease rate of 20° C./min, an isothermic peak at 95° C.-100° C. (crystallization) was observed.

Observations on the optical microscope under polarized light between crossed prisms showed the presence of birefringence of the molten material at temperatures higher than the melting temperature, thus confirming the liquid-crystal characteristics of the polymer.

EXAMPLE 2

By operating under the conditions and with the monomers as disclosed in Example 1, to the reactor:

| 7,oxa-bicyclo(2,2,1)-heptane | 18 ml |
|---|---|
| 1,3-dioxacyclopentane | 1.1 ml |
| BF$_3$.Et$_2$O (20%-vol. ether solution) | 0.3 ml | were charged.

15.5 g was thus obtained (yield: 84%) of a crystalline polymer, as a white powder, having an inherent viscosity of 0.86 dl/g.

At the analysis on the differential calorimeter, the polymer showed a crystalline melting peak at 110° C., and a peak to be attributed to the isotropization at 220-230° C. The observation on the optical microscope confirmed the liquid-crystal characteristics of the molten polymer.

EXAMPLE 3

By operating as described in example 1, following monomers were charged in the reactor:

| 7,oxa-bicyclo(2,2,1)-heptane | 13,5 ml |
|---|---|
| 1,3-dioxacyclopentane | 2,7 ml |
| 1,2-dichloroethane | 26,7 ml |
| PF$_5$ (0,54 M solution in dichloroethane/ether 3:1 v/v) | 0,94 ml |

Polymerization was run at 0° C. for 48 hours and then stopped and the polymer worked up as described in example 1.

The polymer, 12,7 g (yield 80%), had an inherent viscosity of 0,84 dl/g (0,1% solution in m-Cresol at 25° C.). The DSC trace showed a crystalline melting temperature at 157° C. with a fusion enthalpy of 25 J/g and a crystallization peak at 148° C. The observations on the optical microscope confirmed the liquid crystal properties of the polymer above melting temperature.

EXAMPLE 4

1,3,5-trioxane was purified by refluxing and distilling over NaOH pellets.

By operating as described in example 1 the following monomers were charged to the reactor:

| 7,oxa-bicyclo(2,2,1)-heptane | 5,0 ml |
|---|---|
| 1,3,5-trioxane | 0,49 g |
| 1,2-dichloroethane | 15,0 ml |
| PF$_5$ (same solution as example 3) | 0,30 ml |

Polymerization was run at 0° C. for 24 hours, then stopped and polymer worked-out as described in example 1.

The polymer 3,0 g (yield 56%), had an inherent viscosity of 0,62 (0,1% solution in m-cresol at 25° C.) and was crystalline at X ray examination.

The DSC trace showed a crystalline melting temperature at 172° C. with fusion enthalpy of 26 J/g and a crystallization peak at 162° C. The examination on the hot stage between crossed polarizers confirmed the liquid crystalline behaviour above melting temperatures.

What we claim is:

1. Copolyethers displaying anisotropic, liquid crystal properties in the molten state, consisting of copolymers of 7,oxabicyclo(2,2,1)heptane unsubstituted or substituted in the 2-, 3-, 5- and/or 6-positions with alkyl radicals having 1 or 2 carbon atoms, with one or more single-ring or condensed-ring cycloaliphatic ethers comprising the characteristic group:

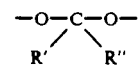

wherein R' is hydrogen and R" is H, a halogen, or an alkyl radical containing 1 or 2 carbon atoms in which one or more hydrogen atoms may be replaced by a halogen, wherein if said ether contains one ring only, from 5 to 12 atoms are contained in the ring, and if a condensed-ring system is present, a total of from 10 to 18 atoms are contained in the rings, and wherein the 7,oxabicyclo(2,2,1)heptane is present in a molar amount from 50 to 99.9% in said copolyethers.

2. Copolyethers as defined in claim 1, wherein the cycloaliphatic ether is 1,3,5-trioxacyclohexane.

3. Copolyethers according to claim 1, wherein R" is H, Cl, F, CH$_3$, C$_2$H$_5$, CH$_2$Cl, CH$_2$F, CF$_3$ or C$_2$F$_5$.

4. Copolyethers according to claim 1, wherein the single-ring cyclic ether is selected from the compounds which are defined by the general formula (II):

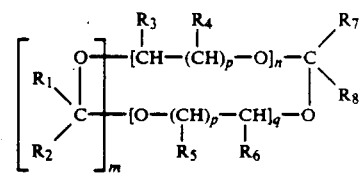

wherein
m=0, 1 or 2;
n=0, 1 or 2;
p=1, 2 or 3;
q=0, 1 or 2;

and wherein R$_1$, R$_2$, R$_3$, R$_4$, R$_5$, R$_6$, R$_7$, R$_8$ are equal to or different from one another and represent H, Cl, F, CH$_3$, C$_2$H$_5$, CH$_2$Cl, CH$_2$F, CF$_3$ or C$_2$F$_5$, with the proviso that, if n=0 and q=0, m=2.

5. Copolyethers according to claim 4, wherein the cyclic ether is selected from the group consisting of: 1,3-dioxacyclopentane, 1,3,6-trioxacyclooctane, 1,3,6,8-tetraoxacyclodecane, 1,3,5-trioxacyclohexane, 1,3-dioxacycloheptane, and their derivatives wherein one or more hydrogen atoms are replaced by CH$_3$ or C$_2$H$_5$;

6. Copolyethers according to claim 1 wherein the condensed-ring cyclic ether is selected from those defined by the general formula (III):

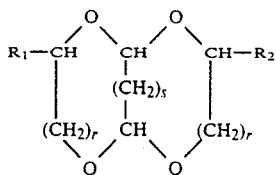

(III)

wherein r=1 or 2, s=0 or 1 and $R_1$ and $R_2$ have the claimed meanings given above.

7. Copolyethers according to claim 6, wherein the condensed-rings cyclic ether is selected from the group consisting of 2,5,7,10-tetraoxa-bicyclo(4,4,0)-decane and its derivatives wherein one or more hydrogen atoms replaced by $CH_3$ or $C_2H_5$.

8. Copolyethers according to claim 1, wherein the cyclic ethers are present in the copolymer in a molar amount within the range of from 2 to 20%, relative to the total monomers.

9. Copolyethers according to claim 1, having an inherent viscosity in 60/40 (by volume) phenol/tetrachloroethane, of from 0.3 to 5 dl/g.

10. Process for preparing the copolyethers according to claim 1 comprising reacting 7,oxabicyclo(2.2.1)heptane with the cyclic ethers having the general formula (II) or (III) in the presence of a cationic polymerization catalyst.

11. Shaped articles based on the copolyethers of claim 1, fabricated under such conditions as to take advantage of the properties deriving from the liquid-crystal state.

* * * * *